United States Patent
Wright

(10) Patent No.: US 10,769,514 B2
(45) Date of Patent: Sep. 8, 2020

(54) PERSONAL SOUND METER AND BROADCASTING/REPORTING SYSTEM

(71) Applicant: Paul Wright, Great Neck, NY (US)

(72) Inventor: Paul Wright, Great Neck, NY (US)

(73) Assignee: COVIDIEN LP, Mansfield, MA (US)

( * ) Notice: Subject to any disclaimer, the term of this patent is extended or adjusted under 35 U.S.C. 154(b) by 0 days.

(21) Appl. No.: 16/674,316

(22) Filed: Nov. 5, 2019

(65) Prior Publication Data
US 2020/0143220 A1    May 7, 2020

Related U.S. Application Data

(60) Provisional application No. 62/756,179, filed on Nov. 6, 2018.

(51) Int. Cl.
   *G06K 19/077*    (2006.01)
   *G06K 19/00*     (2006.01)
   *H05B 45/20*     (2020.01)

(52) U.S. Cl.
   CPC ...... *G06K 19/07711* (2013.01); *G06K 19/005* (2013.01); *G06K 19/07705* (2013.01); *G06K 19/07762* (2013.01); *H05B 45/20* (2020.01)

(58) Field of Classification Search
None
See application file for complete search history.

(56) References Cited

U.S. PATENT DOCUMENTS

| | | | |
|---|---|---|---|
| 2013/0331153 A1* | 12/2013 | Krimstock | H04M 1/05 455/569.1 |
| 2015/0355349 A1* | 12/2015 | Suzuki | G01T 1/026 250/370.07 |
| 2016/0240075 A1* | 8/2016 | Eisenman | H04W 4/90 |

* cited by examiner

*Primary Examiner* — Kristy A Haupt

(57) ABSTRACT

A sound monitoring system includes an identification card holder and a central processing and monitoring system in wireless communication with the identification card holder. The identification card holder is wearable on a body of a user, and includes a microphone for receiving sound and a visual sound indicator for displaying a noise level of the sound received through the microphone. The central processing and monitoring system processes sound data received from the identification card holder and transmits the processed sound data back to the identification card holder for display of the noise level represented by the processed sound data.

20 Claims, 2 Drawing Sheets

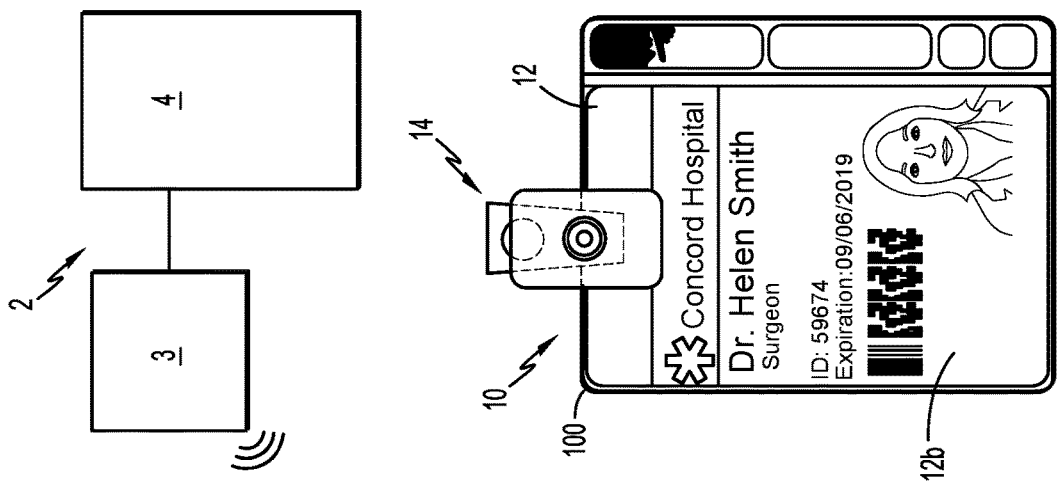
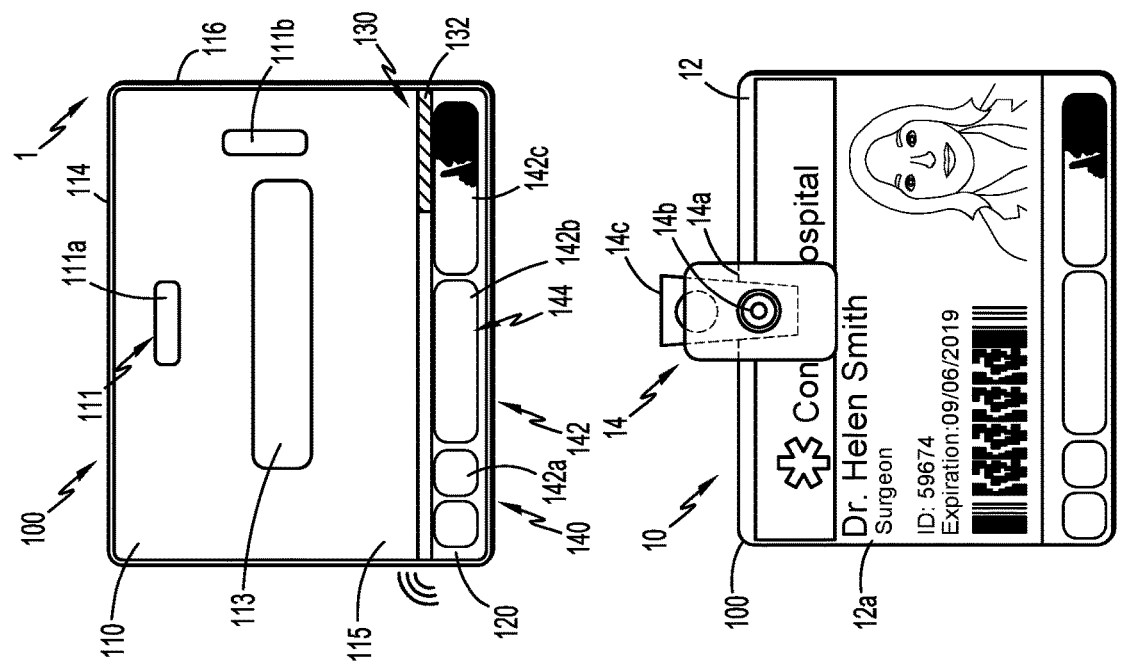

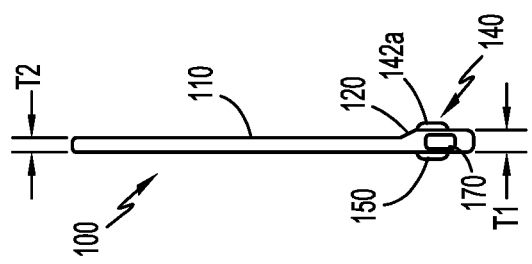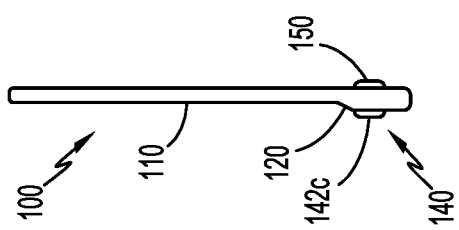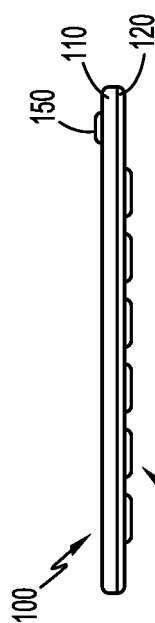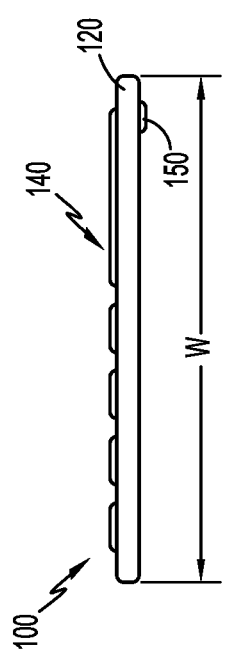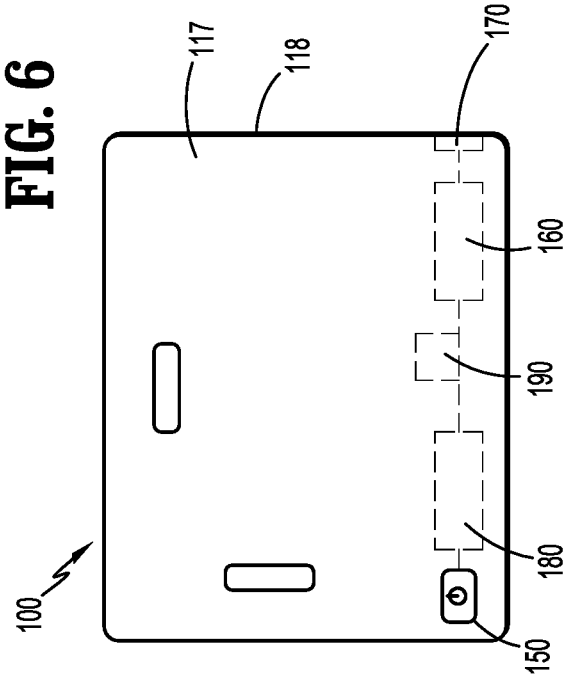

PERSONAL SOUND METER AND BROADCASTING/REPORTING SYSTEM

CROSS-REFERENCE TO RELATED APPLICATIONS

This application claims the benefit of and priority to U.S. Provisional Patent Application No. 62/756,179, filed Nov. 6, 2018, the entire content of which is incorporated herein by reference.

TECHNICAL FIELD

The present technology is generally related to wearable devices, and more particularly, to an identification card holder for sound monitoring.

BACKGROUND

Recently, significant attention has focused on the hospital environment due to multiple factors, ranging from hospital ratings to patient satisfaction. Hospital noise levels have especially been a focus. One aspect of noise complaints usually focuses on staff members simply being too loud. For example, this occurs when healthcare workers congregate at nursing stations, typically occurring at night, thus causing disruption in patient sleep patterns. Increased noise levels impact the healing process and have been shown to result in worse patient outcomes. Frequently, healthcare workers shout to their colleagues on the medical ward, unaware of the noise they emit and oblivious to the impact on patients. People feel uncomfortable notifying their coworkers that they are simply talking too loud.

Hospitals have been given star ratings that rank the hospitals on a variety of properties, with each section carrying equal weight. The quiet environment of the hospital is deemed so important that it has its own section. Due to elevated noise levels impacting patient healing, along with hospitals striving for high star ratings, novel and innovative ways to address this situation are desired.

SUMMARY

The personal sound meter and broadcasting/reporting system of the present disclosure monitors the noise levels of a user and/or the user's environment, in real time, and notifies the user of the noise level. The personal sound meter and broadcasting/reporting system may help reduce noise levels (for example, in a hospital ward) by making the user aware of their noise level so that they can quiet down, without making the individual feel uncomfortable.

The personal sound meter and broadcasting/reporting system is utilized with an existing identification card of the user, thus integrating the personal sound meter and broadcasting/reporting system into a required work component that is visibly displayed on the body of the user, making it easy for the user to utilize the system.

The personal sound meter and broadcasting/reporting system tracks the noise level for each user, generally, or in different departments (e.g., hospital wards) or work areas (e.g., nursing stations). The personal sound meter and broadcasting/reporting system can track users who have consistent elevated noise levels so that corrective action (e.g., educational seminars on communication) can be employed to reduce or eliminate the occurrence of elevated noise levels.

In one aspect, the present disclosure provides a sound monitoring system including an identification card holder and a central processing and monitoring unit in wireless communication with the identification card holder. The identification card holder is wearable on a body of a user, and includes a microphone for receiving sound and a visual sound indicator for displaying a noise level of the sound received through the microphone. The central processing and monitoring system processes sound data received from the identification card holder and transmits the processed sound data back to the identification card holder for display of the noise level represented by the processed sound data.

The identification card holder may include an identification card frame configured to retain an identification card thereagainst. The identification card holder may include a wing extending from the identification card frame, and the microphone and the visual sound indicator may be disposed within the wing. The wing may have a thickness that is greater than a thickness of the identification card frame such that when an identification card is secured to the identification card frame the identification card is flush with the wing of the identification card holder.

The microphone may include a grill positioned in a front face of the identification card holder and/or the visual sound indicator may include at least one light disposed on the front face of the identification card holder. The at least one light may include first and second colored lights indicating acceptable noise levels, and a third colored light indicating an unacceptable noise level. The first, second, and third colored lights may be light-emitting diodes.

The identification card holder may include a power button and a power source. The identification card holder may include a recharging terminal for the power source. The identification card holder may include a control board for capturing the sound data of the sound received through microphone. The control board may receive the processed sound data from the central processing and monitoring unit, and send control signals to the visual sound indicator. The identification card holder may include a communications transmitter and the central processing and monitoring unit may include a communications receiver for transmitting and receiving the sound data.

In another aspect, the present disclosure provides an identification card holder includes an identification card frame configured to retain an identification card thereagainst, and a wing extending from the identification card frame. The wing includes a sound monitoring assembly including a microphone for receiving sound and a visual sound indicator for displaying a noise level of the sound received through the microphone.

The visual sound indicator may include at least one light disposed on a front face of the identification card holder. The at least one light may include first and second colored lights indicating acceptable noise levels, and a third colored light indicating an unacceptable noise level. The first, second, and third colored lights may be light-emitting diodes.

The sound monitoring assembly may include a power button and a power source. The sound monitoring assembly may include a recharging terminal for the power source. The sound monitoring assembly may include a control board for capturing sound data of the sound received through the microphone.

The details of one or more aspects of the disclosure are set forth in the accompanying drawings and the description below. Other aspects, features, and advantages will be apparent from the description and drawings, and from the claims.

BRIEF DESCRIPTION OF DRAWINGS

FIG. 1 is a front view of a sound monitoring system including an identification card holder and a central processing and monitoring unit, in accordance with an embodiment of the present disclosure;

FIG. 2 is a front view of the identification card holder of the sound monitoring system of FIG. 1, shown with an identification card and a badge clip attached thereto, in accordance with an embodiment of the present disclosure;

FIG. 3 is a front view of the identification card holder of the sound monitoring system of FIG. 1, shown with an identification card and a badge clip attached thereto, in accordance with another embodiment of the present disclosure;

FIGS. 4 and 5 are top and bottom views, respectively, of the identification card holder of the sound monitoring system of FIG. 1;

FIGS. 6 and 7 are side views of the identification card holder of the sound monitoring system of FIG. 1; and FIG. 8 is a back view of the identification card holder of the sound monitoring system of FIG. 1.

DETAILED DESCRIPTION

Embodiments of the present disclosure will now be described in detail with reference to the drawing figures wherein like reference numerals identify similar or identical elements. Throughout this description, the terms "user" and "wearer" are used interchangeably to refer to the person using the device. The terms "generally," "substantially," and "about" shall be understood as words of approximation that take into account relatively little to no variation in the modified terms (e.g., differing by less than 10%). In the following description, well-known functions or constructions are not described in detail to avoid obscuring the present disclosure in unnecessary detail.

Referring now to FIG. 1, a personal sound meter and broadcasting/reporting system, or sound monitoring system 1 is shown. The sound monitoring system 1 includes an identification (ID) card holder 100 and a central processing and monitoring unit or system 2. The ID card holder 100 may be identified, sold, and/or marketed as the Stargain™ ID. The ID card holder 100 is in wireless communication with the central processing and monitoring unit 2 for real-time processing, monitoring, and notification of the noise level of and/or around the user of the ID card holder 100. The central processing and monitoring unit 2 is configured for processing and monitoring a plurality of ID card holders 100 simultaneously and in real time. As shown in FIGS. 2 and 3, the ID card holder 100 is configured for use as an identification and sound monitoring assembly 10 with an identification (ID) card 12 (e.g., badge or tag), to be worn on the body of a user.

As shown in FIGS. 1-3, the ID card holder 100 includes an ID card frame 110 sized and shaped for use with the ID card 12. The ID card 12 may be of conventional type utilized to, among other things, identify the wearer, as is within the purview of those skilled in the art. The ID card frame 110 includes at least one slot 111 defined therethrough that is sized and shaped to coincide with the size and shape of a slot (not explicitly shown) defined through the ID card 12 such that a badge clip 14 may be passed therethrough to couple the ID card 12 and the ID card holder 100 together. The badge clip 14 may be of conventional type including a strap 14a which may be looped through the ID card 12 and the ID card holder 100, a snap fastener 14b for enclosing the loop, and a clip 14c or other securement mechanisms (e.g., an eyelet for a lanyard) for attachment to the body of the user.

As seen in FIG. 1, the ID card holder 100 includes a first slot 111a and a second slot 111b so that the ID card holder 100 is suitable for use with a horizontally oriented ID card 12a, as seen in FIG. 2, or a vertically oriented ID card 12b, as seen in FIG. 3. It should be understood that the ID card holder may be configured for use with ID cards of varying sizes and/or configurations. For example, the ID card frame 110 of the ID card holder 100 may include a pocket or other securement mechanism in which to place or attach the ID card 12. The ID card holder 100 may further include at least one opening 113 defined therethrough for access to information that may be provided on the back of the ID card 12 (e.g., a barcode).

Turning now to FIGS. 1 and 4-6, the ID card holder 100 includes an extension or wing 120 extending from a longitudinal side 114 of the ID card frame 110, and having the same width "W" as the ID card frame 110. The width "W" of the ID card holder 100 may be from about 3 inches to about 4 inches, and in embodiments, the width "W" of the card holder 100 is about 3.5 inches. It is contemplated that the ID card frame 110 and/or the wing 120 may have other widths, and/or the wing 120 may extend from a lateral side 116 of the ID card frame 110.

As seen in FIG. 7, the wing 120 is substantially flat and has a thickness "T1" that is greater than the thickness "T2" of the ID card frame 110. The thicknesses "T1," "T2" may be such that when an ID card 12 (see e.g., FIG. 2) is attached to the ID card holder 100, the ID card 12 is flush with the wing 120, giving the ID card holder 100 with attached ID card 12 an overall uniform thickness. The thickness of the wing 120 may be from about 0.08 inches to about 0.24 inches and, in embodiments, the thickness "T1" of the wing 120 is about is about 0.16 inches.

With reference again to FIG. 1, the wing 120 includes a microphone 130 and a visualizable sound meter or visual sound indicator 140 disposed therein. The microphone 130 includes a grill 132 (e.g., a wind screen) in the front face or surface 115 of the ID card holder 100 for picking up sound. The visual sound indicator 140 includes one or more lights 142 that illuminate and/or change color for displaying the noise level of the received sound. The visual sound indicator 140 is coupled to a noise meter that is calibrated to a standard or pre-determined acceptable noise level for a particular environment, such as a hospital ward. The visual sound indicator 140 may show acceptable and/or unacceptable noise levels. Additionally, the visual indicator may include indicia 144 conveying the noise condition (e.g., "QUIET ZONE") or the user response requested (e.g., "QUIET" or "SHHH").

As seen in FIG. 1, the lights 142 of the visual sound indicator 140 may be an array of light-emitting diodes (LEDs). The LEDs illuminate depending upon the detected noise level between a first colored light 142a (e.g., a green LED), a second colored light 142b (e.g., a yellow LED), and a third colored light 142c (e.g., a red LED). The first and second colored lights 142a, 142b (e.g., green and yellow lights, respectively) indicate an acceptable quite zone or noise level, with the first colored light 142a representing the noise around the wearer is at an acceptable level and the second colored light 142b representing the noise around the wearer is approaching an unacceptable level. The third colored light 142c (e.g., red light) indicates the noise around the wearer is beyond the acceptable level and represents the need to lower the noise level. In embodiments, more than one of each of the first, second and/or third colored lights 142a-142c may be provided to show where the user's noise level is within the range represented by the array of lights 142. As seen in FIGS. 4-6, the lights 142 of the visual sound indicator 140 may protrude slightly from the wing 120 or, alternatively, the lights 142 may be flush with the wing 120.

Turning now to FIGS. 7 and 8, in conjunction with FIG. 1, the ID card holder 100 includes a power button 150, a power source or battery 160, a recharging terminal 170, a control board 180, and a communications transmitter 190. The power button 150 is disposed on the back face or surface 117 of the ID card holder 100 and is configured to power the ID card holder 100 on and off. The power button 150 is in electrical communication with the power source 160, which is a rechargeable battery that may be charged through the recharging terminal 170 disposed in a side surface 118 of the ID card holder 110. Alternatively, the power source 160 may be a replaceable battery accessible through a battery door (not shown) provided on the back face 117 of the ID card holder 100.

The power button 150 is in electrical communication with the control board 180 which includes a processor and memory for system control and sound data generation, capture, and/or processing. The control board 180 is in electrical communication with the communications transmitter 190, as well as the microphone 130 and the visual sound indicator 140. The communications transmitter 190 transmits and receives sound data or signals to and from a communications receiver 3 of the central processing and monitoring unit 2 via a wireless connection (e.g., radiofrequency, optical, WiFi, Bluetooth®, LTE, etc.).

The control board 180 receives sound from the microphone 130 and transmits the sound data to the central processing and monitoring unit 2 via communication between the communications transmitter 190 and the communications receiver 3. The central processing and monitoring unit 2 includes a computer 4 which processes the sound data and sends the processed sound data back to the control board 180 via the communications receiver and transmitter 3, 190 which, in turn, sends control signals to the visual sound indictor 140 to illuminate the light 142 represented by the processed sound data.

In a method of use, the sound monitoring system 1 is utilized in a medical environment (e.g., in a hospital). The ID card holder 100 of the sound monitoring system 1 is worn on the body of a user, and is in communication with the central processing and monitoring unit 2 of the sound monitoring system 1 to process, monitor, and convey the wearer's noise level, as described above. The ID card holder 100 displays the real-time or current noise level of the wearer via the visual sound indicator 140 which, in turn, is utilized by the wearer to determine a proper course of action (e.g., to be quieter). The central processing and monitoring unit 2 may be configured to record and store metrics related to the noise levels being monitored by the ID card holder 100, for example, and not limited to, the time of day for highest noise levels for particular ID card holders 100, locations of the noise levels for particular ID card holder 100, and/or the specific ID card holder 100 associated with the particular noise levels. The central processing and monitoring unit 2 may be configured to provide suggested actions to reduce the noise level, generate reports associated with the recorded and stored metrics related to the noise levels.

It should be understood that while the sound monitoring system is described herein for use with medical professionals in a hospital ward, the sound monitoring system may be utilized in a variety of industries and/or have other applications. For example, the sound monitoring system may be utilized by personnel is noisy environments (e.g., airports or construction sites) to monitor the noise level of the worker's environment to determine if the worker is being exposed to excessive noise levels (e.g., the visual sound indicator may provide a warning that protective hearing equipment should be utilized by the wearer).

Persons skilled in the art will understand that the systems, assemblies, devices, and methods specifically described herein and illustrated in the accompanying figures are non-limiting exemplary embodiments, and that the description, disclosure, and figures should be construed merely exemplary of particular embodiments. It is to be understood, therefore, that the disclosure is not limited to the precise embodiments described, and that various other changes and modifications may be effected by one skilled in the art without departing from the scope or spirit of the disclosure. Additionally, it is envisioned that the elements and features illustrated or described in connection with one exemplary embodiment may be combined with the elements and features of another exemplary embodiment without departing from the scope of the disclosure, and that such modifications and variations are also intended to be included within the scope of the disclosure. Accordingly, the subject matter of the disclosure is not to be limited by what has been particularly shown and described.

What is claimed is:

1. A sound monitoring system comprising:
an identification card holder wearable on a body of a user, the identification card holder including a microphone for receiving sound and a visual sound indicator for displaying a noise level of the sound received through the microphone; and
a central processing and monitoring system in wireless communication with the identification card holder for processing sound data received from the identification card holder and transmitting the processed sound data back to the identification card holder for display of the noise level represented by the processed sound data.

2. The sound monitoring system according to claim 1, wherein the identification card holder includes an identification card frame configured to retain an identification card thereagainst.

3. The sound monitoring system according to claim 2, wherein the identification card holder includes a wing extending from the identification card frame, and the microphone and the visual sound indicator are disposed within the wing.

4. The sound monitoring system according to claim 3, wherein the wing has a thickness that is greater than a thickness of the identification card frame such that when an identification card is secured to the identification card frame the identification card is flush with the wing of the identification card holder.

5. The sound monitoring system according to claim 1, wherein the microphone includes a grill positioned in a front face of the identification card holder.

6. The sound monitoring system according to claim 1, wherein the visual sound indicator includes at least one light disposed on a front face of the identification card holder.

7. The sound monitoring system according to claim 6, wherein the at least one light includes first and second colored lights indicating acceptable noise levels, and a third colored light indicating an unacceptable noise level.

8. The sound monitoring system according to claim 7, wherein the first, second, and third colored lights are light-emitting diodes.

9. The sound monitoring system according to claim 1, wherein the identification card holder includes a power button and a power source.

10. The sound monitoring system according to claim 9, wherein the identification card holder includes a recharging terminal for the power source.

11. The sound monitoring system according to claim 9, wherein the identification card holder includes a control board for capturing the sound data of the sound received through the microphone.

12. The sound monitoring system according to claim 11, wherein the control board receives the processed sound data from the central processing and monitoring unit, and sends control signals to the visual sound indicator.

13. The sound monitoring system according to claim 1, wherein the identification card holder includes a communications transmitter and the central processing and monitoring unit includes a communications receiver for transmitting and receiving the sound data.

14. An identification card holder comprising:
   an identification card frame configured to retain an identification card thereagainst; and
   a wing extending from the identification card frame, the wing including a sound monitoring assembly including:
   a microphone for receiving sound; and
   a visual sound indicator for displaying a noise level of the sound received through the microphone.

15. The identification card holder according to claim 14, wherein the visual sound indicator includes at least one light disposed on a front face of the identification card holder.

16. The identification card holder according to claim 15, wherein the at least one light includes first and second colored lights indicating acceptable noise levels, and a third colored light indicating an unacceptable noise level.

17. The identification card holder according to claim 16, wherein the first, second, and third colored lights are light-emitting diodes.

18. The identification card holder according to claim 14, wherein the sound monitoring assembly includes a power button and a power source.

19. The identification card holder according to claim 18, wherein the sound monitoring assembly includes a recharging terminal for the power source.

20. The identification card holder according to claim 18, wherein the sound monitoring assembly includes a control board for capturing sound data of the sound received through the microphone.

\* \* \* \* \*